United States Patent [19]

Aulson

[11] Patent Number: 5,507,122
[45] Date of Patent: *Apr. 16, 1996

[54] MOBILE DELEADING UNIT

[76] Inventor: Alan P. Aulson, 201 Pond St., Georgetown, Mass. 01833

[*] Notice: The term of this patent shall not extend beyond the expiration date of Pat. No. 5,365,013.

[21] Appl. No.: 334,968

[22] Filed: Nov. 7, 1994

Related U.S. Application Data

[63] Continuation of Ser. No. 179,768, Jan. 19, 1994, Pat. No. 5,365,013, which is a continuation of Ser. No. 757,960, Sep. 12, 1991, abandoned.

[51] Int. Cl.$^6$ .................................................. B65F 3/00
[52] U.S. Cl. .................. 52/79.1; 144/252 R; 144/286 A; 296/24.1
[58] Field of Search .............................. 83/471.3; 52/33, 52/79.1, 79.8; 144/252 R, 252 A, 286 R, 286 A; 296/24.1; 588/249

[56] References Cited

U.S. PATENT DOCUMENTS

| | | | |
|---|---|---|---|
| 2,365,940 | 12/1944 | Couse | 144/285 X |
| 2,677,571 | 5/1954 | Williams | 296/24.1 |
| 2,893,066 | 7/1959 | Perdue | 52/79.8 |
| 3,401,724 | 9/1968 | Kreitz | 144/252 R X |
| 3,601,521 | 8/1971 | Morton | 52/79.8 |
| 3,628,578 | 12/1971 | Berg | 83/471.3 |
| 3,923,134 | 12/1975 | Rezazadeh | 52/79.1 X |
| 4,055,206 | 10/1977 | Griffin | 144/285 |
| 4,201,256 | 5/1980 | Truhan | 144/252 A |
| 4,250,669 | 2/1981 | Freeauf | 52/79.8 |
| 4,409,889 | 10/1983 | Burleson | 52/79.1 X |
| 4,485,859 | 12/1984 | Krogstad et al. | 144/252 R |
| 4,643,476 | 2/1987 | Montgerard | 144/286 R X |
| 4,858,256 | 8/1989 | Shankman | 296/24.1 X |
| 5,078,567 | 1/1992 | Lombardo | 296/24.1 X |
| 5,084,972 | 2/1992 | Waugh | 144/252 R X |
| 5,116,184 | 5/1992 | Pellegrini | 296/24.1 X |
| 5,365,013 | 11/1994 | Aulson | 588/249 |

*Primary Examiner*—John A. Ricci
*Attorney, Agent, or Firm*—Don Halgren

[57] ABSTRACT

A mobile trailer adapted to receive hazardous waste building products such as lead painted windows, doors, door frames, sills and the like. The trailer is lined to prevent escape of toxic air and dust. The trailer contains wood working machinery to plane and cut lead painted wood surfaces from the wood building material fed therein. The lead painted wood scraps are then encapsulated into compact bales, washed and stored within the trailer to await hauling by a waste haul service. The stripped wood once having had its lead paint surfaces cut away, is passed from the trailer.

12 Claims, 3 Drawing Sheets

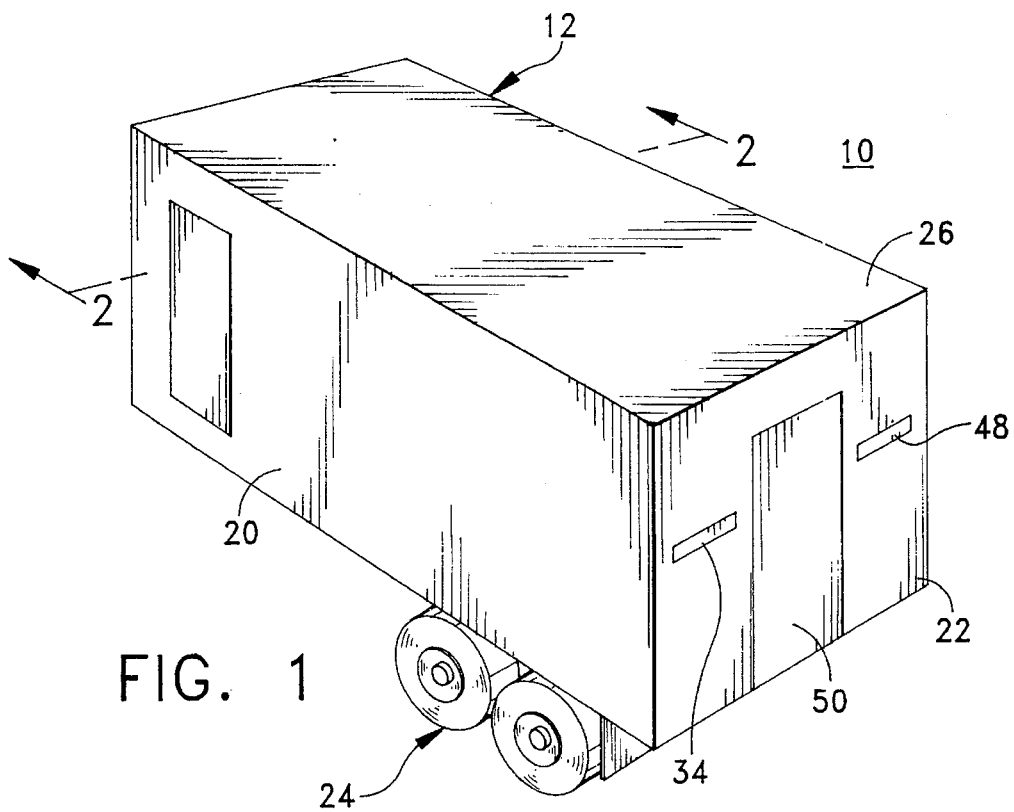
FIG. 1
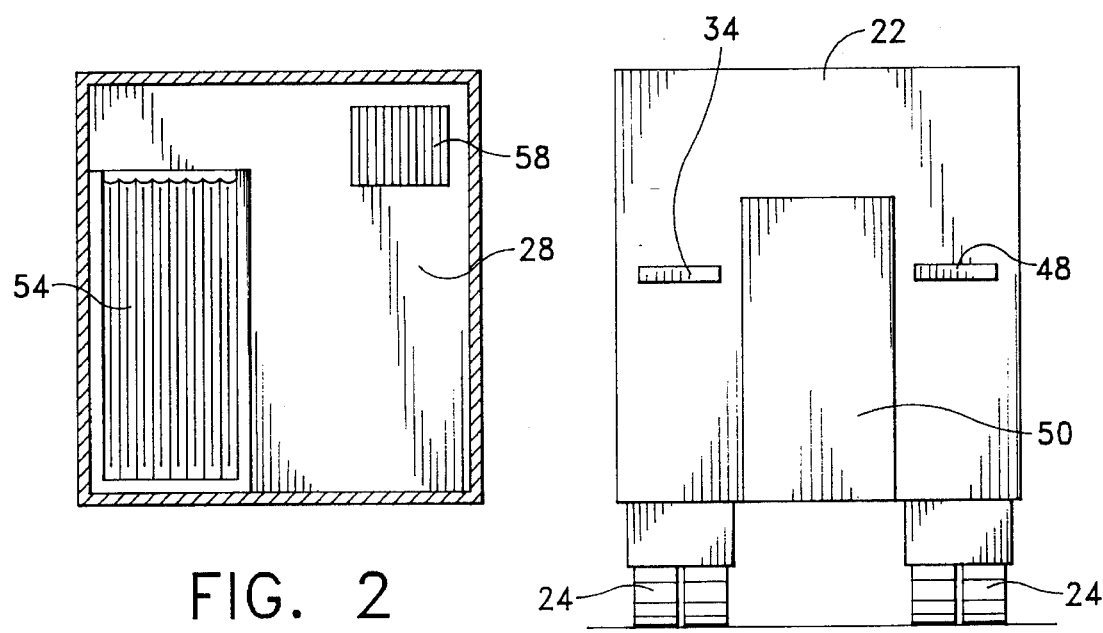
FIG. 2
FIG. 3

MOBILE DELEADING UNIT

This is a Continuation of application Ser. No. 08/179,768, now U.S. Pat. No. 5,365,013, which is a Continuation of Ser. No. 07/757,960, filed Sep. 12, 1991, now abandoned, each of which is incorporated herein by reference in their entireties.

BACKGROUND OF THE INVENTION

1. Field of the Invention

This invention relates to systems for the treatment of lead based paint in buildings and more particularly to an apparatus and method for safe removal and treatment of lead based painted wood.

2. Prior Art

Lead paint has been prohibited from residential and commercial buildings for a number of years. Rental apartments may not be rented to tenants without the elimination of lead paint from lower woodwork accessible to children.

States have been unanimous across the country, in passing laws requiring the de-leading of rental property.

Property owners and banks which have taken over property under foreclosure are under a tremendous strain to clean up their properties.

Typically, only 25 micrograms of lead per deciliter of blood can affect the mental capacities of young children and can result in grave behavioral and physical problems. Incredibly, 52%, or about 42 million of the nations' households still have layers of lead-based paint on their woodwork.

Lead is highly toxic, even in minute quantities. Once it is ingested, lead enters the bloodstream where it inhibits the production of hemoglobin which red blood cells need to carry oxygen. Lead also locks out essential enzymes in the brain and central nervous system to inactivate them. Symptoms of lead poisoning include abdominal pains, muscular weakness and fatigue, while severe exposure may cause nervous system disorders, high blood pressure and even death.

Young children are most vulnerable because their nervous systems and brains are still developing. Lead can be removed from humans by a process called chelation, using drugs that bind to the metal in the bloodstream and flush it out in the urine, if treatment is begun before too much damage is done.

However, medical treatment is no substitute for a safe environment. The Health and Human Services Agency plan calls for: (1) surveillance of children with elevated levels of lead in their blood; (2) elimination of leaded paint and contaminated dust in housing; (3) reduction of children's exposure to lead in food, air, soil and water; and (4) an increase in community programs for the prevention of childhood lead poisoning. Eliminating lead from all pre-1950 housing would save as much as $28 billion in medical expenses and other costs, but at an expense of about $10 billion to put this plan into effect over the next 10 years.

BRIEF SUMMARY OF THE INVENTION

The present invention comprises a system for the removal and disposal of hazardous lead painted wood waste and construction debris from a building site; done in conformance with Environmental Protection Agency (EPA) requirements for the disposition of such waste.

The present invention therefore comprises a novel arrangement for the treatment of wood construction material which has been painted with a lead based paint. The novel arrangement comprises an environmentally controlled unit which receives such construction material as doors, door frames, windows, window frames, sills and the like from a building site being treated or refurbished.

The environmentally controlled unit comprises a mobile trailer which is sealed to minimize the spreading of environmental contamination, preventing accidental passage of leaded waste from the inside of the unit to the outside of the unit. The mobile unit comprises a box trailer having a floor, a ceiling, front, side and back walls, mounted on a wheel structure so as to permit its movement from construction site to construction site.

The mobile unit box trailer in the preferred embodiment has an internal length of about 40 feet, an internal width of about 10 feet and an internal height of about 8 feet.

The walls, ceiling and floor are covered with a layer of plastic to effect a barrier to the escape of environmentally hazardous waste from the inside of the unit. A bulkhead divides the mobile unit into a treatment module and a rinse and store module. The treatment module has a receiving port means at its distal end, to permit the passing of environmentally hazardous wood material therein. A plurality of typical shop type woodworking machines are arranged within the treatment module, including a hopper/compactor for encapsulating hazardous lead paint cut from wood passed into the treatment module.

The treatment module also has a discharge port means at its distal end, to permit the passing of cleaned, environmentally safe wood material therefrom.

A cleansing means is arranged at the bulkhead, to rinse hazardous powder or contaminants from the encased hazardous lead paint cut from the wood passed into the treatment module and into the rinse and store module. The rinsed encased container of hazardous lead painted wood trimmed from the environmentally hazardous waste construction material is stored in the storage module to await pick-up by a hazardous waste material carrier, to an environmentally safe containment site. Discharge doors are disposed through the sidewall of the storage module to permit the removal or discharge of encapsulated containers from the storage module.

The treatment module includes air filtration means which generates an air pressure differential or lower pressure within the treatment and waste storage modules, to prevent the leakage of contaminants out either the receiving port or the discharge port, the filtration means discharging only cleaned air back out from the treatment module.

The woodworking machines are disposed alongside workbenches, to plane and chop the hazardous surfaces off of such construction material for subsequent encasement and disposal.

BRIEF DESCRIPTION OF THE DRAWINGS

The objects and advantages of the present invention will become more apparent when viewed in conjunction with the following drawings, in which:

FIG. 1 is a perspective view of the mobile hazardous waste treatment unit from the rearward end thereof;

FIG. 2 is a view taken along the lines A—A of FIG. 1, showing the bulkhead dividing the modules within said treatment unit;

FIG. 3 A is a plan view of the mobile hazardous waste treatments unit; and

DESCRIPTION OF THE PREFERRED EMBODIMENTS

Figure 3A:
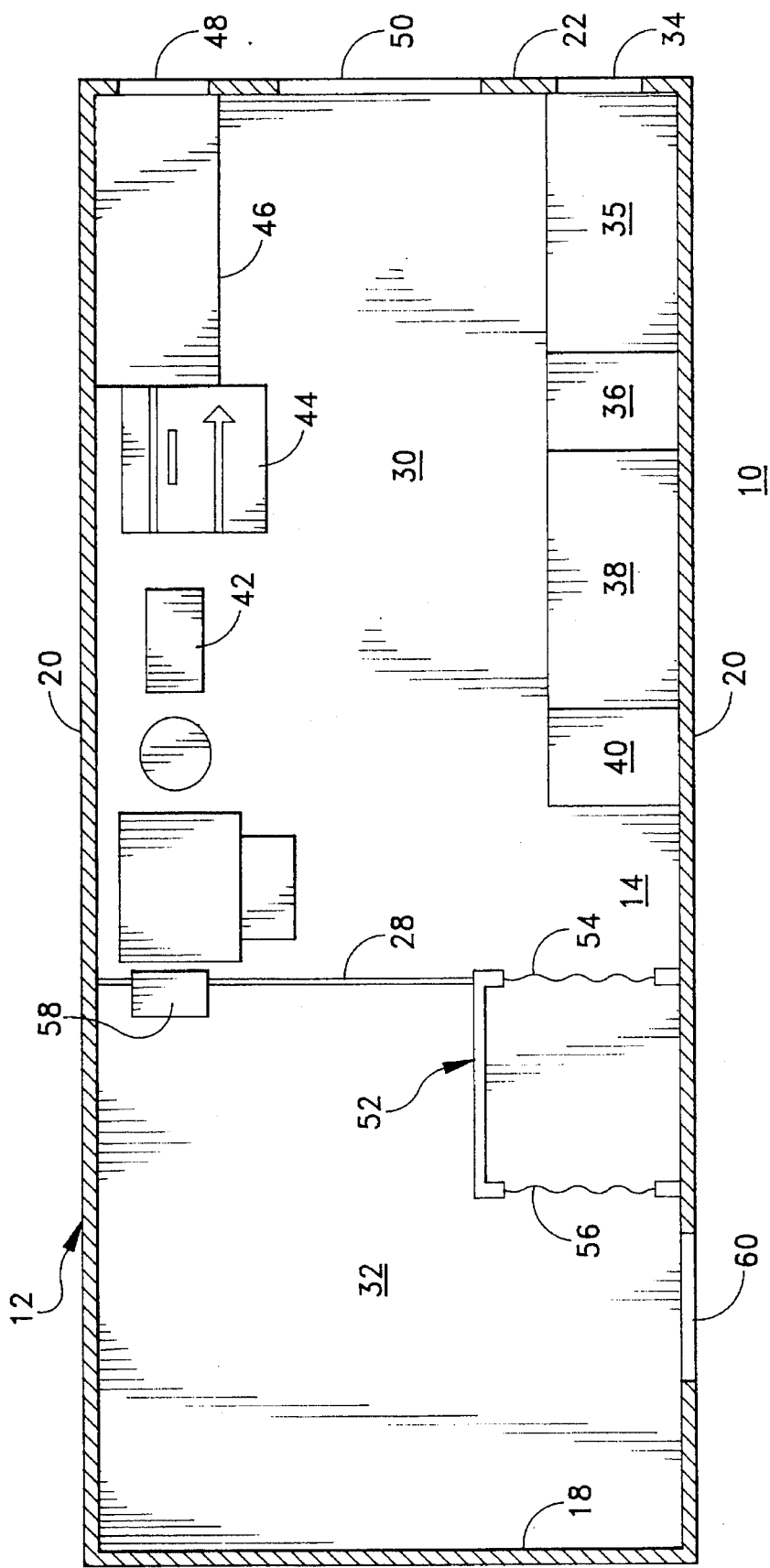
FIG. 3 is an elevational view of the distal endwall of the mobile unit, from the outside thereof.

Referring to the drawings in detail, and particularly to FIG. 1, there is shown a mobile deleading unit 10 treatment facility adapted for the removal and disposal of hazardous lead painted wood waste and construction debris from a building/construction site, done in conformance with Federal Environmental Protection Agency (EPA) requirements for the disposition of such waste.

My co-pending U.S. patent application, Ser. No. 07/692,934 filed 04/29/91, likewise dealing with treatment of lead base painted wood, is incorporated herein by reference.

The present mobile deleading unit 10 treatment facility is arranged to receive construction/renovation material such as painted doors, doorframes, windows, window frames, sills and the like, not shown, from a building/reconstruction site being treated or refurbished.

The mobile deleading unit 10 comprises a compartmentalized mobile trailer 12, which is sealed from spreading environmentally contaminated lead paint waste from the inside of the mobile deleading unit 10 to the outside of the mobile deleading unit 10. The mobile trailer 12 is a box-like structure having a floor 14, a ceiling 16, a front wall 18, a pair of side walls 20 and a back wall 22, as shown in FIGS. 1,3 and 4. The mobile trailer 12 includes an arrangement of axled wheels 24. The mobile trailer 12 may be movable by an attachable tractor, not shown, so as to enable it to be moved from one construction/building renovation site to another.

The mobile trailer 12 in this embodiment has an internal length of about 40 feet, an internal width of about 10 feet, and an internal height of about 8 feet.

The walls 18, 20 and 22, as well as the floor 14 and the ceiling 16 are sealed, such as by a layer of plastic sheet 26 within or on them to effect a barrier to the escape of environmentally hazardous lead paint waste from the inside of the mobile deleading unit 10. A bulkhead 28, shown in FIGS. 2, 3A and 4 divides the mobile unit 10 into a treatment module 30 and a rinse and store module 32.

The treatment module 30 has a receiving port 34 in the back wall 22 in its distal end, to permit the passing (entry) of environmentally lead painted wood therein. The receiving port 34 of about 30 inches wide and about 3 inches in height and may have a flap means or opposed bristles spaced across the opening to minimize leakage of air into or out of the mobile unit 10.

Figure 4:
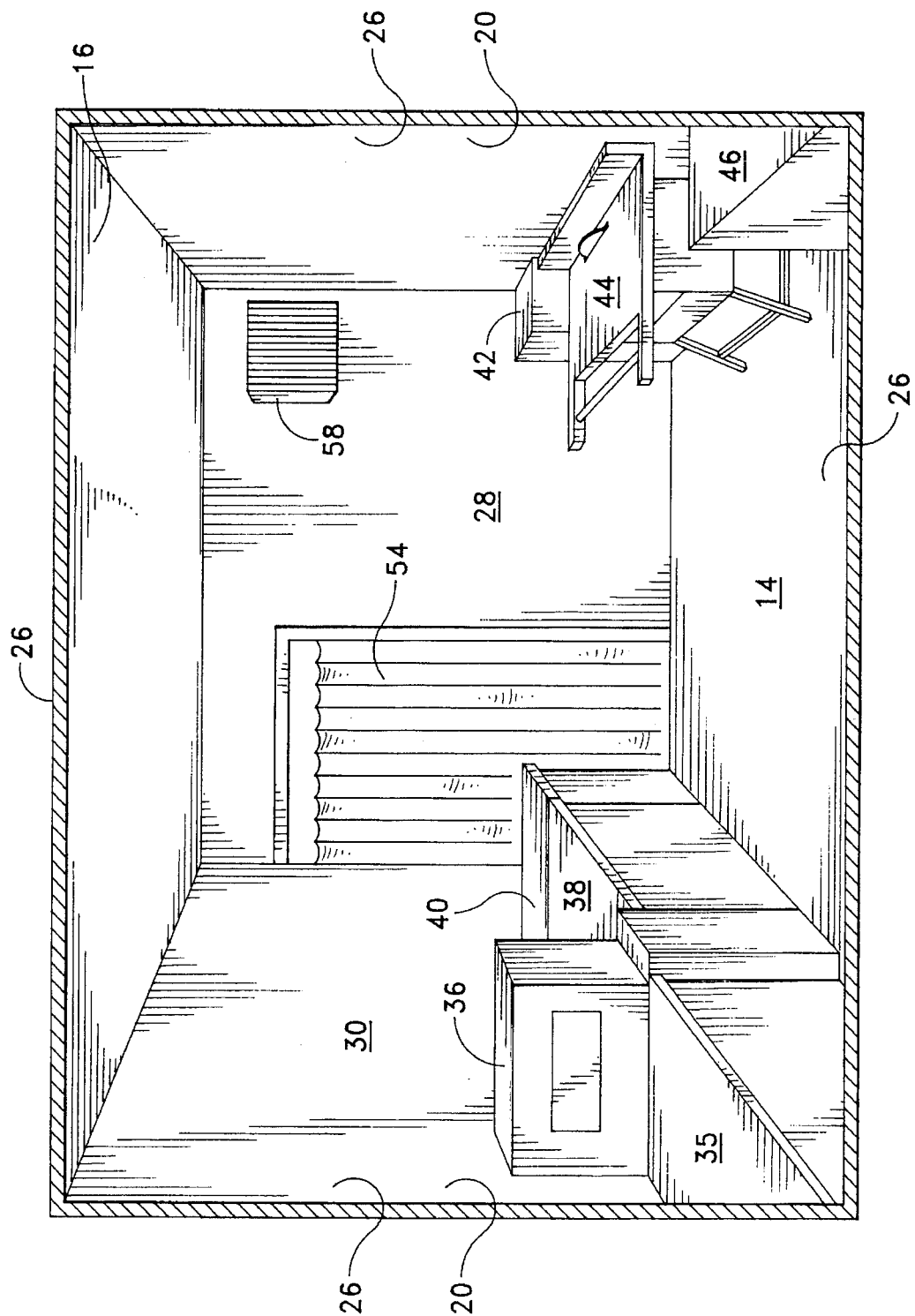
FIG. 4 is a view within the treatment module of the mobile hazardous waste treatment unit, looking forwardly therein.

The treatment module 30 has a first work bench 35 about 30 inches high and eight feet long adjacent the receiving port 34, as shown in FIG. 3A. A typical shop type wood thickness planer 36 of the type that planes off a wide layer of material a fraction of an inch in depth from a wide wood surface, as known in the woodworking industry, such as a Delta DC brand woodplaner, may be disposed adjacent the first bench 35. A second bench 38, generally similar to the first work bench 35, may be arranged forwardly or downstream of the wood planer 36. A typical chop saw 40 of the type that cross-cuts wood boards, as is known in the woodworking industry, such as a Delta brand 10 inch radial saw, may be arranged downstream of and contiguous to the second bench 38, all of which may be disposed along the side wall 20 adjacent the receiving port 34.

The other side wall 20 on the other (long) side of the treatment module 30 may have a compactor unit 42 as may be known in the trash collection or compaction business, such as a PSI (Pollution Systems Inc.) brand Model 30 waste compactor, disposed thereadjacent, as shown in FIG. 3A, utilized to squeeze material into compact bundles in a plastic bag or wrap of environmentally safe material such as foil or plastic sheet or the like. A typical table saw 44 of the type to make longitudinal cuts in boards, as is known in the woodworking industry, such as a Delta brand 10 inch table saw, may be arranged adjacent the compactor unit 42, and a third bench 46, generally similar to the aforementioned first and second benches 35 and 38, may be disposed in-line with the table saw 44. A discharge port 48 of shallow slot-like configuration, on the order of about 24 inches wide by about 3 inches high, may be arranged in the back wall 22 adjacent the third bench 46, as shown in FIGS. 1 and 3, the port 24 having a flexible flap or bristles thereacross to minimize air passage therethrough. An entry door 50, of a dimension of about 6 feet high by about 30 inches wide may be arranged in the back wall 22 to permit entry and exit for personnel who operate the woodworking devices within the treatment module 30.

A cleansing means 52, comprising a downwardly directed shower head 53, is disposed through the ceiling 16 forward of the bulkhead 28. A first and a second flexible shower drape 54 and 56 may be arranged on the forward and rearward side of the cleansing means 52. The cleansing means 52 has a central drain in the floor 14, which drain includes a filter, not shown, for collecting hazardous rinsed-off material. An electrically powered air pump and filtration unit 58 is securely arranged through the side wall 20 to maintain a pressure differential to pull air into the treatment module 30, and filter it before it is ejected outside of the deleading unit 10. The cleansing means 52 is defined as part of the rinse and store module 32.

A discharge door 60 of a height of about 6 feet and a width of about 30 inches is arranged through the side wall 20, as shown in FIG. 1. The discharge door 60 provides an opening from the outside into the rinse and store module 32.

In operation of the deleading unit 10, the mobile trailer 12 is hauled to a construction/refurbishing site by a tractor or the like, which is typical for hauling 40 foot highway trailers. Lead painted wood trim such as windows, doors and door frames and the like are fed into the treatment module 30 through the receiving port 34. The wood planer 36 is energized to plane off the top and bottom planar surfaces to a depth of about 0.125 inches from each of the painted surfaces of the painted wood. The chop saw 40 is energized to cut the lengths of planed yet still hazardous wood scrap into more readily handlable size of about 3 foot lengths. The hazardous wood of now shorter length is fed through the table saw 44 to trim off about one quarter of an inch from the painted longitudinal edges of the painted wood, which wood, having most (not necessarily absolutely all) of the hazardous lead paint removed, is discharged from the third bench 46 out the rear of the treatment module 30, through the discharge port 48.

The thin scraps of lead painted wood which have been planed or sawed from the majority of the outer surfaces of the lead painted wood fed into the treatment module are now deposited into the compactor 42. The compactor 42 encapsulatively presses the lead painted wood scraps into plastic encased bales, not shown. The bales are then placed in the cleansing means 52, where dust and lead debris are washed therefrom in the shower. The bales are then advanced into the store portion of the rinse and store module 32 to await pick-up from a proper hazardous waste shipper service.

The air filtration unit 58 such as the Mach Lite brand negative system sold by Critical Industries, Inc., maintains a negative pressure within the deleading unit 12 while it is operational, thus ensuring that hazardous/toxic fumes and air do not escape, but are filtered first, the filters being replacable, the used filters being scrapped with the hazardous lead painted wood removed from the construction debris. The operators of the deleading unit 10 who operate the woodworking machines 36, 40, 44 and the compactor 42 wear hazardous-waste proof body suits so as to not contaminate themselves as they operate the treatment process equipment.

Thus, what has been shown is a novel apparatus and method for treating hazardous lead painted wood of the type typically found in older homes, apartments and buildings across the nation today. This novel mobile apparatus and method permits almost complete deleading of such contaminated wood waste at a construction/refurbishing site so as to absolutely minimize the handling of those contaminated wood components, and safely and effectively seal them up in environmentally safe bales encased in plastic sheet, the hazardous lead paint wood surfaces having been machined from the contaminated wood, the bales being more safely disposable than any other arrangement for the leaded material.

I claim:

1. A mobile decontamination unit structure comprising:

a box trailer unit having a plurality of side walls, a front wall, a rear wall, a floor and a ceiling;

said structure having containment means therein to minimize leakage of any hazardous waste particles therefrom;

said structure having empowered mechanical apparatus therein for the safe removal of hazardous waste from material brought into said structure;

a partition within said structure which divides said box trailer into at least two compartments;

a first of said compartments arranged to contain and utilize said mechanical apparatus to treat the hazardous waste therein;

another of said compartments arranged to contain any hazardous waste removed from the material in said first compartment: and a mechanism in said box trailer unit arranged to reduce and maintain the air pressure lower within said unit compared to the air pressure outside of said unit.

2. The mobile decontamination unit as recited in claim 1, including an air filtration system arranged through one of said side walls, to trap any hazardous particulate matter therein.

3. The mobile decontamination unit as recited in claim 2, wherein said air filtration system maintains a lower air pressure within said first compartment than exists outside of said box trailer unit.

4. The mobile decontamination unit as recited in claim 3, including encapsulation means for compacting and encapsulating any hazardous waste into bales.

5. The mobile decontamination unit as recited in claim 4, including washing means for cleansing hazardous from any entities egressing said first compartment.

6. A mobile decontamination unit structure for the treatment of hazardous wastes, comprising:

a mobile trailer having front, rear and side walls, a floor and a roof;

said structure having containment means therein to minimize leakage of any hazardous waste particles therefrom;

said structure having empowered mechanical apparatus therein for the safe removal of hazardous waste from material brought into said structure; and an arrangement in said trailer to reduce and maintain the air pressure within said trailer lower than the air pressure outside of said trailer.

7. The mobile decontamination unit as recited in claim 6, wherein said arrangement to reduce the air pressure within said trailer unit comprises an air filtration system.

8. The mobile decontamination unit as recited in claim 7, including encapsulation means for compacting and encapsulating any hazardous waste products therein.

9. A mobile decontamination unit structure for the treatment of hazardous wastes comprising:

a mobile trailer having front, rear and side walls, a floor and a roof;

said structure having containment means therein to minimize leakage of any hazardous waste particles therefrom;

said structure having empowered mechanical apparatus therein for the safe removal of hazardous waste from material brought into said structure; and an air filtration system arranged within said trailer which filtration system maintains a lower air pressure within said trailer than the air pressure which exists outside of said trailer.

10. The mobile decontamination unit structure as recited in claim 9, including:

a plurality of partitions to divide said trailer into a plurality of compartments to minimize spreading of contamination therein.

11. The mobile decontamination unit structure as recited in claim 10, wherein an encapsulation means is arranged in one of said compartments, for compacting and encapsulating any hazardous waste products therein.

12. The mobile decontamination unit structure as recited in claim 11, wherein said hazardous waste comprises lead paint.

* * * * *